United States Patent
Tamao et al.

(10) Patent No.: US 12,367,678 B2
(45) Date of Patent: Jul. 22, 2025

(54) IMAGE EXTRACTION DEVICE, VEHICLE, IMAGE EXTRACTION SYSTEM, IMAGE EXTRACTION METHOD, AND STORAGE MEDIUM STORING IMAGE EXTRACTION PROGRAM

(71) Applicant: TOYOTA JIDOSHA KABUSHIKI KAISHA, Toyota (JP)

(72) Inventors: Junichiro Tamao, Nagoya (JP); Hiroaki Nagase, Fujisawa (JP); Hirotaka Nakayama, Toyota (JP); Akihiro Motoda, Toyota (JP); Ryo Mizuno, Miyoshi (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 424 days.

(21) Appl. No.: 17/892,521

(22) Filed: Aug. 22, 2022

(65) Prior Publication Data
US 2023/0102610 A1 Mar. 30, 2023

(30) Foreign Application Priority Data
Sep. 28, 2021 (JP) .................... 2021-158462

(51) Int. Cl.
- G06V 20/40 (2022.01)
- G06Q 50/00 (2012.01)
- G06V 10/74 (2022.01)

(52) U.S. Cl.
CPC .......... *G06V 20/46* (2022.01); *G06Q 50/01* (2013.01); *G06V 10/761* (2022.01); *G06V 2201/07* (2022.01)

(58) Field of Classification Search
CPC .. G06V 20/46; G06V 10/761; G06V 2201/07; G06Q 50/01
USPC ......................................... 382/190
See application file for complete search history.

(56) References Cited

U.S. PATENT DOCUMENTS

| | | | |
|---|---|---|---|
| 2019/0047582 A1* | 2/2019 | Anderson | B60K 35/00 |
| 2019/0325219 A1* | 10/2019 | Lin | G06V 40/28 |
| 2021/0174101 A1 | 6/2021 | Nishiyama et al. | |

(Continued)

FOREIGN PATENT DOCUMENTS

| | | |
|---|---|---|
| JP | 2011-114508 A | 6/2011 |
| JP | 2013-54430 A | 3/2013 |

(Continued)

OTHER PUBLICATIONS

Zhang, Zehua, Chen Yu, and David Crandall. "A self validation network for object-level human attention estimation." Advances in Neural Information Processing Systems 32 (2019). (Year: 2019).*

(Continued)

*Primary Examiner* — Jonathan S Lee
(74) *Attorney, Agent, or Firm* — Oliff PLC

(57) ABSTRACT

The image extraction device includes a processor. The processor acquires footage of outside a vehicle captured by an image capture device onboard the vehicle, extracts from the footage plural extracted images that are images including an image captured at a point in time satisfying a predetermined condition, infers a desired image that is an image most desirable to an occupant of the vehicle from out of the plural extracted images, and outputs the desired image.

14 Claims, 10 Drawing Sheets

(56) References Cited

U.S. PATENT DOCUMENTS

2022/0164958 A1* 5/2022 Jung .................. B60R 1/22
2022/0307855 A1* 9/2022 Deng ............. G02B 27/0101

FOREIGN PATENT DOCUMENTS

JP      2019-114875 A    7/2019
JP      2021-089639 A    6/2021

OTHER PUBLICATIONS

Venuprasad, Pranav, et al. "Analyzing gaze behavior using object detection and unsupervised clustering." ACM Symposium on Eye Tracking Research and Applications. 2020. (Year: 2020).*

Jeelani, Idris, et al. "Real-world mapping of gaze fixations using instance segmentation for road construction safety applications." arXiv preprint arXiv:1901.11078 (2019). (Year: 2019).*

* cited by examiner

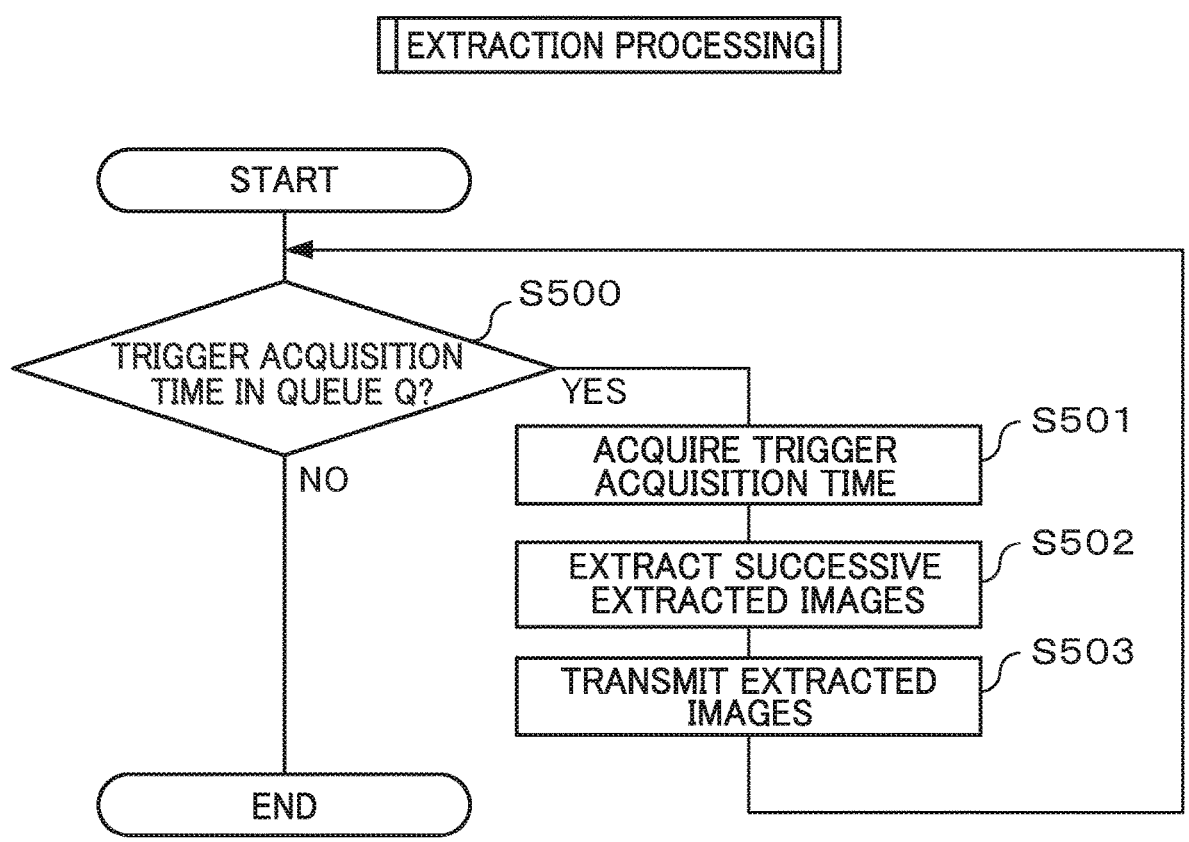

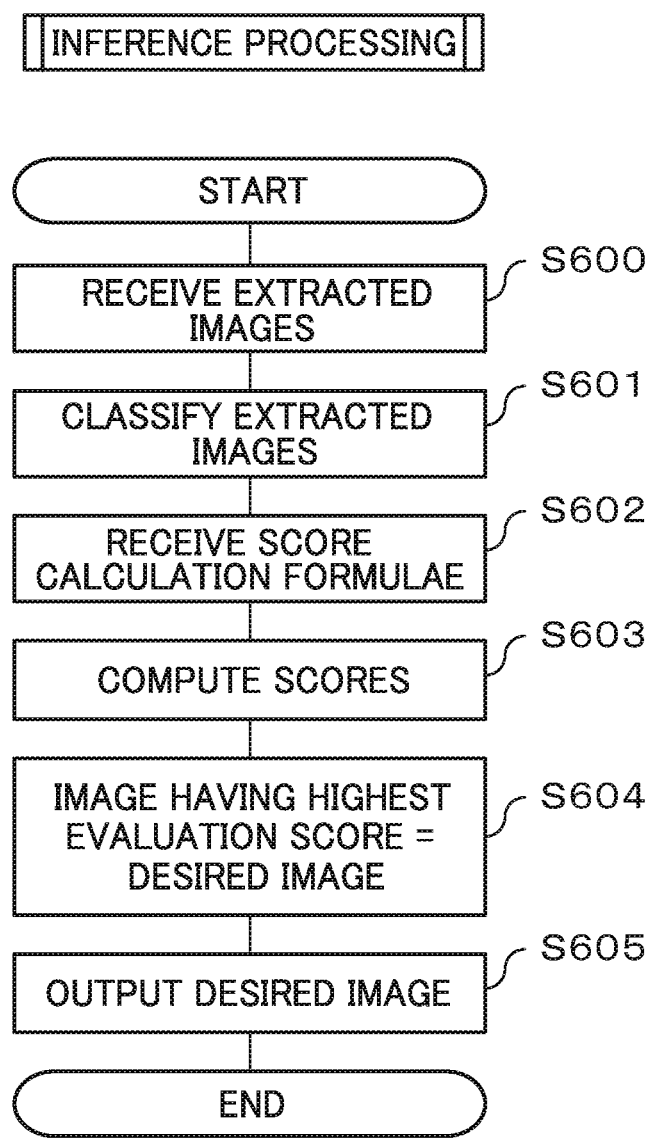

IMAGE EXTRACTION DEVICE, VEHICLE, IMAGE EXTRACTION SYSTEM, IMAGE EXTRACTION METHOD, AND STORAGE MEDIUM STORING IMAGE EXTRACTION PROGRAM

CROSS-REFERENCE TO RELATED APPLICATION

This application is based on and claims priority under 35 USC 119 from Japanese Patent Application No. 2021-158462 filed on Sep. 28, 2021, the disclosure of which is incorporated by reference herein.

BACKGROUND

Technical Field

The present disclosure relates to an image extraction device, a vehicle, an image extraction system, an image extraction method, and a storage medium storing an image extraction program.

Related Art

Japanese Patent Application Laid-Open (JP-A) No. 2019-114875 discloses an image capture device that infers an imaging subject that matches preferences of an occupant based on results of machine learning on imaging subjects of images uploaded by the occupant to an SNS, and instructs an image capture section for capturing images of outside of the vehicle to capture the inferred imaging subject.

However, the image capture section in the image capture device of JP-A No. 2019-114875 captures an image once alone, and so there is a possibility that the image captured by the image capture section might not be the most desirable image for the occupant.

SUMMARY

In consideration of the above circumstances, an object of the present disclosure is to provide an image extraction device, a vehicle, an image extraction system, an image extraction method, and a storage medium storing an image extraction program for which is a higher likelihood of being able to output the most desirable image for the occupant than cases in which image capture is performed once alone.

An image extraction device according to a first aspect includes an acquisition section that acquires footage of an area outside a vehicle, the footage captured by an image capture device installed at the vehicle, an extraction section that extracts, from the footage, plural extracted images that are images including an image captured at a point in time satisfying a predetermined condition, an inference section that determines a desired image that is an image most desirable to an occupant of the vehicle, from among the plural extracted images, and an output section that outputs the desired image.

In the image extraction device according to the first aspect the acquisition section acquires the footage of an area outside the vehicle, the footage captured by the image capture device installed at the vehicle, the extraction section extracts, from the footage, plural extracted images that are images including an image captured at a point in time satisfying the predetermined condition, the inference section determines the desired image that is the image most desirable to the occupant of the vehicle, from among the plural extracted images, and the output section outputs the desired image. The image extraction device of the first aspect accordingly has a higher likelihood of being able to output the most desirable image for an occupant than cases in which image capture is performed once alone.

An image extraction device according to a second aspect is the image extraction device of the first aspect wherein, as the extracted images, the extraction section extracts images including an image captured at a point in time when a state of the occupant changed.

The image extraction device of the second aspect is accordingly able to extract images including an image captured at a point in time when a state of the occupant changed even in cases in which the occupant was not able to perform a physical image capture instruction such as by pressing a switch or the like.

An image extraction device of a third aspect is the image extraction device of the first aspect or the second aspect wherein, as the extracted images, the extraction section extracts images including an image captured at a point in time when the occupant spoke a predetermined word.

The image extraction device of the third aspect is accordingly able to extract images including an image captured at a point in time when the occupant spoke a predetermined word even in cases in which the occupant was not able to perform a physical image capture instruction such as by pressing a switch or the like.

An image extraction device of a fourth aspect is the image extraction device of any one of the first aspect to the third aspect wherein, as the extracted images, the extraction section extracts images including an image captured at a point in time when the vehicle passed a predetermined site.

The image extraction device of the fourth aspect is accordingly able to extract images including an image captured at a point in time when the vehicle passed a predetermined site even in cases in which the occupant was not able to perform a physical image capture instruction such as by pressing a switch or the like.

An image extraction device of a fifth aspect is an image extraction device of any one of first aspect to fourth aspect wherein the inference section determines the desired image based on a result of machine learning performed on images posted via a social networking service.

The image extraction device of the fifth aspect accordingly enables the desired image to be determined from the plural extracted images based on images posted via a social networking service.

An image extraction device of a sixth aspect is the image extraction device of the fifth aspect wherein the inference section determines the desired image based on a result of machine learning performed on images posted by the occupant via a social networking service.

The image extraction device of the sixth aspect accordingly enables the desired image to be determined from the plural extracted images based on images posted by the occupant via a social networking service.

An image extraction device of a seventh aspect is the image extraction device of any one of the first aspect to the fourth aspect wherein the inference section determines the desired image based on a result of machine learning performed on a behavior history of the occupant.

The image extraction device of the seventh aspect accordingly enables the desired image to be determined from the plural extracted images based on the behavior history of the occupant.

A vehicle of an eighth aspect includes the image extraction device of any one of the first aspect to the seventh aspect and the image capture device.

The vehicle of the eighth aspect has a higher likelihood of being able to output the most desirable image for an occupant than cases in which image capture is performed once alone.

The image extraction system of a ninth aspect includes the image extraction device of any one of first aspect to the seventh aspect, and a mobile terminal, wherein the mobile terminal includes a display device to display the desired image.

The image extraction system of the ninth aspect has a higher likelihood of being able to display the most desirable image for an occupant on the display device than cases in which image capture is performed once alone.

An image extraction method of a tenth aspect includes processing for execution by a computer. The processing includes acquiring footage of an area outside a vehicle, the footage captured by an image capture device installed at the vehicle, extracting, from the footage, plural extracted images that are images including an image captured at a point in time satisfying a predetermined condition, determining a desired image that is an image most desirable to an occupant of the vehicle, from among the plural extracted images, and outputting the desired image.

The image extraction method of the tenth aspect has a higher likelihood of being able to output the most desirable image for an occupant than cases in which image capture is performed once alone.

A non-transitory storage medium of an eleventh aspect is stored with an image extraction program that causes a computer to execute processing. The processing includes acquiring footage of an area outside a vehicle, the footage captured by an image capture device installed at the vehicle, extracting, from the footage, plural extracted images that are images including an image captured at a point in time satisfying a predetermined condition, determining a desired image that is an image most desirable to an occupant of the vehicle, from among the plural extracted images, and outputting the desired image.

The non-transitory storage medium storing the image extraction program of the eleventh aspect has a higher likelihood of being able to output the most desirable image for an occupant than cases in which image capture is performed once alone.

The present disclosure has a higher likelihood of being able to output the most desirable image for an occupant than cases in which image capture is performed once alone.

BRIEF DESCRIPTION OF THE DRAWINGS

Exemplary embodiments of the present disclosure will be described in detail based on the following figures, wherein:

FIG. 9 is a flowchart to illustrate an example of a flow of extraction processing performed by a control device according to the second exemplary embodiment; and FIG. 10 is a flowchart to illustrate an example of a flow of inference processing performed by an inference device according to the second exemplary embodiment.

DETAILED DESCRIPTION

Explanation follows regarding an image extraction system that is an exemplary embodiment of the present disclosure, with reference to the drawings.

First Exemplary Embodiment

Configuration

Figure 1:
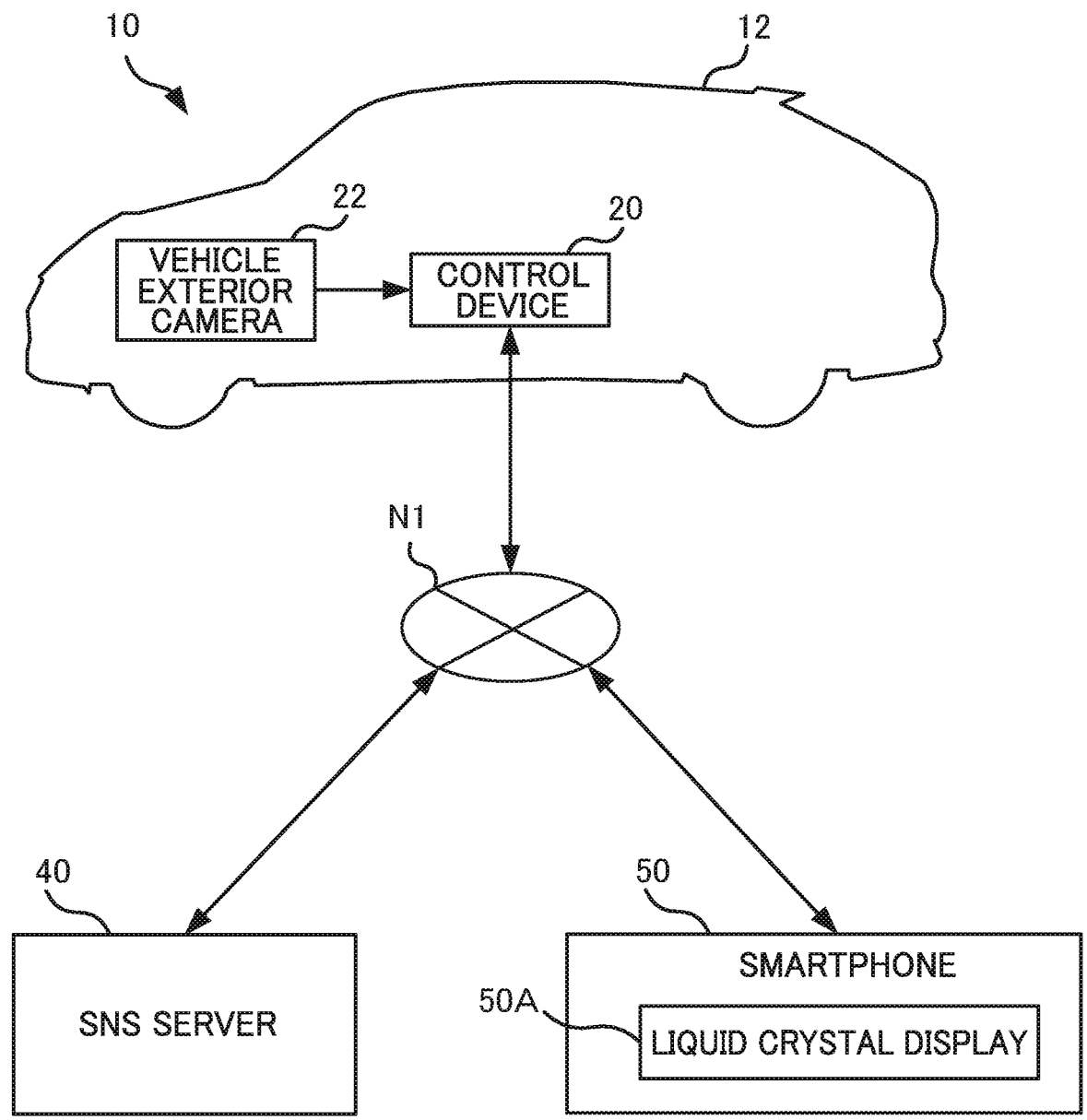
FIG. 1 is a diagram illustrating a schematic configuration of an image extraction system according to a first exemplary embodiment.

FIG. 1 is a block diagram illustrating a schematic configuration of an image extraction system 10 according to the present exemplary embodiment.

As illustrated in FIG. 1, the image extraction system 10 according to the present exemplary embodiment includes a vehicle 12, a social networking service (SNS) server 40, and a smartphone 50 that is a mobile terminal. The vehicle 12, the SNS server 40, and the smartphone 50 are connected to each other over a network N1. The vehicle 12 includes a control device 20 serving as an image extraction device, and a vehicle exterior camera 22 serving as an image capture device.

The SNS server 40 includes a function as a management server to manage a social networking service (hereinafter simply referred to as SNS). Data related to posts for respective user accounts are stored in the SNS server 40. Explanation follows regarding an example of a case in which a user of the SNS server 40 is an occupant of the vehicle 12.

The smartphone 50 is a mobile terminal carried by an occupant of the vehicle 12 (hereinafter simply referred to as the "occupant"). Note that another mobile terminal, such as a personal computer or a tablet terminal, may be employed instead of the smartphone 50. The smartphone 50 includes a liquid crystal display 50A that is a display device for displaying a desired image, described later, as output from the control device 20.

Figure 2:
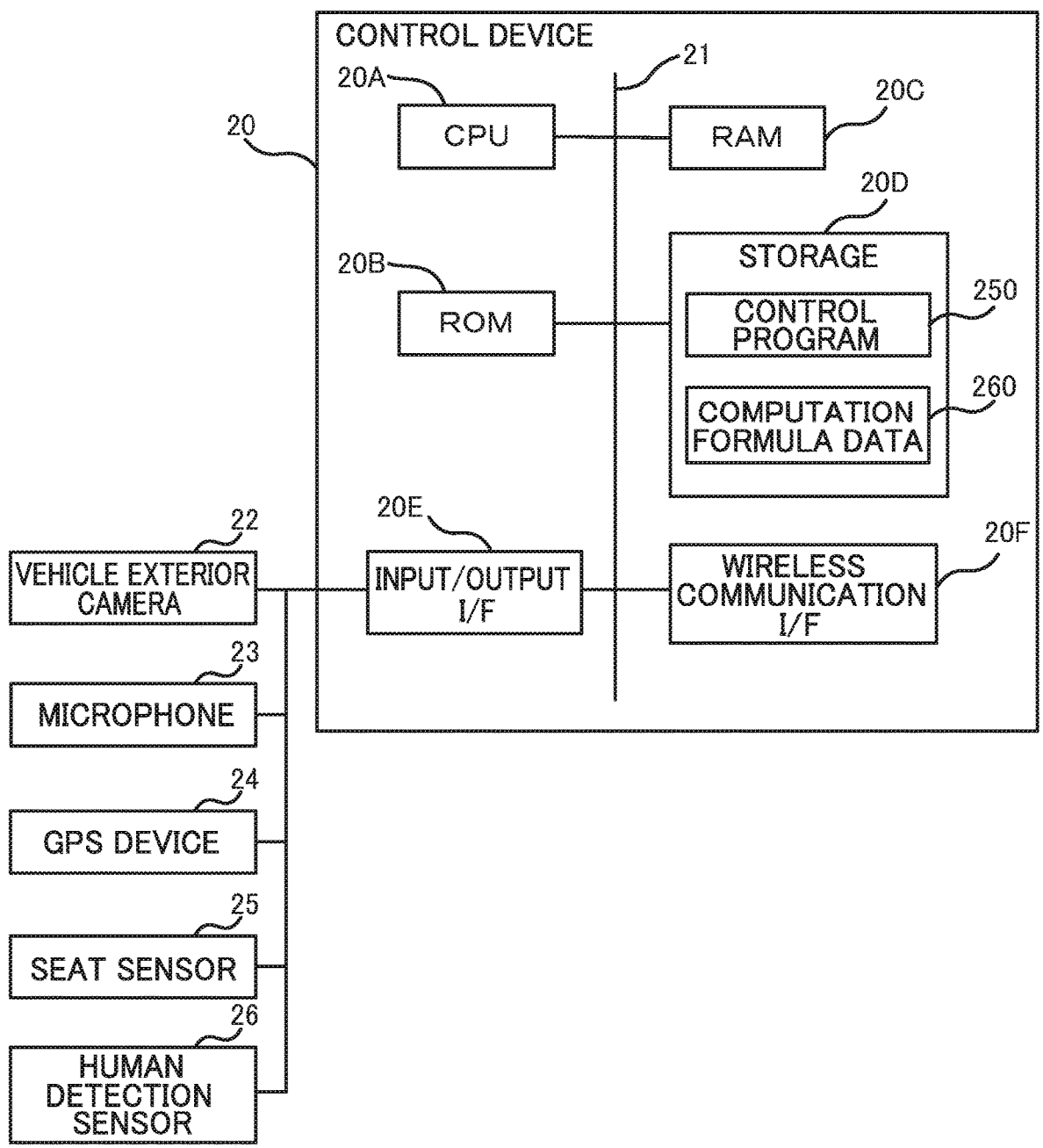
FIG. 2 is a block diagram illustrating a hardware configuration of a device installed at a vehicle according to the present exemplary embodiment.

FIG. 2 is a block diagram illustrating a hardware configuration of a device installed at the vehicle 12 of the present exemplary embodiment.

The vehicle exterior camera 22 is an image capture device for capturing footage of an area outside the vehicle. The vehicle exterior camera 22 may be provided outside the vehicle and may be provided inside the vehicle.

A microphone 23 is a device for picking up speech spoken by an occupant. The microphone 23 is provided to an instrument panel, a center console, a front pillar, a dashboard, or the like.

A GPS device 24 is a device for acquiring position information of the vehicle 12.

A seat sensor 25 is, for example, a sensor employing a piezoelectric element or the like to detect changes in pressure due to an occupant sitting down. The seat sensor 25 is, for example, provided to a sitting surface of a driver seat.

A human detection sensor 26 is a sensor employing infrared, ultrasound, or visible light, for example, to detect the presence of a human who has come close to the vehicle 12. The human detection sensor 26 is provided to a bumper section or the like. Note that the human detection sensor 26 may also be a sensor for detecting occupants. In such cases the human detection sensor 26 is provided inside the vehicle 12.

The control device 20 is structured to include a CPU (Central Processing Unit) 20A, a ROM (Read Only Memory) 20B, a RAM (Read Only Memory) 20C, a storage 20D, an input/output I/F (interface) 20E, and a wireless communication I/F 20F. The CPU 20A, the ROM 20B, the RAM 20C, the storage 20D, the input/output I/F 20E, and the wireless communication I/F 20F are connected together through a bus 21 so as to be able to communicate with each other. The CPU 20A is an example of a processor.

Figure 3:
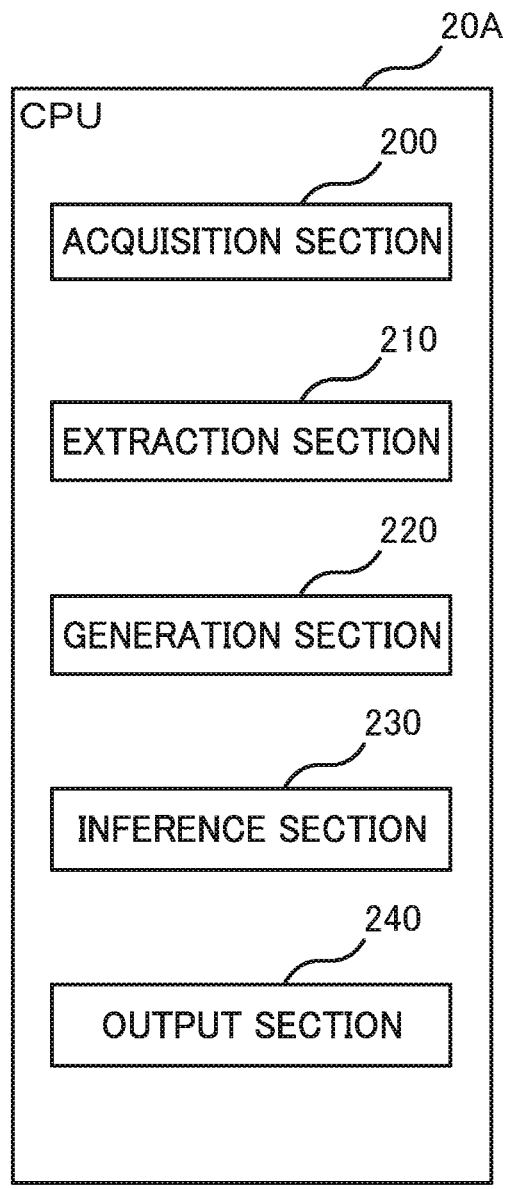
FIG. 3 is a block diagram illustrating an example of a functional configuration of a CPU in a control device according to the present exemplary embodiment.

The CPU 20A is a central processing unit that executes various programs and controls each sections. Namely, the CPU 20A reads-out programs from the ROM 20B or the storage 20D, and executes the programs using the RAM 20C as a workspace. In the present exemplary embodiment a control program 250, described later, is stored in the storage 20D. By executing the control program 250 the CPU 20A functions as an acquisition section 200, an extraction section 210, a generation section 220, an inference section 230, and an output section 240, as illustrated in FIG. 3.

The ROM 20B stores with various programs and various data. The RAM 20C serves as workspace to temporarily store programs and data. The storage 20D serves as a storage section, is structured by a hard disk drive (HDD) or a solid state drive (SSD), and stores various programs including an operating system and various data. The storage 20D of the present exemplary embodiment stores the control program 250 and computation formula data 260.

The input/output I/F 20E is an interface for communication with various devices installed at the vehicle 12. The vehicle exterior camera 22, the microphone 23, the GPS device 24, the seat sensor 25, and the human detection sensor 26 are connected through the input/output I/F 20E to the control device 20 of the present exemplary embodiment. The vehicle exterior camera 22, the microphone 23, the GPS device 24, the seat sensor 25, and the human detection sensor 26 may be directly connected to the bus 21.

The wireless communication I/F 20F is an interface for communication with other devices such as the SNS server 40 and the smartphone 50, and employs a standard such as, for example, Ethernet (registered trademark), FDDI, or Wi-Fi (registered trademark).

The control program 250 serves as an image extraction program, and is a program for controlling the control device 20.

Score calculation formulae for calculating evaluation scores for extracted images, described later, are stored in the computation formula data 260 by genre, which is a rough indication of the imaging subject such as sea, airplane, person, or the like.

FIG. 3 is a block diagram illustrating an example of a functional configuration of the CPU 20A. As illustrated in FIG. 3, the CPU 20A includes the acquisition section 200, the extraction section 210, the generation section 220, the inference section 230, and the output section 240. Each functional configuration is implemented by the CPU 20A reading the control program 250 stored in the storage 20D and executing the control program 250.

The acquisition section 200 includes functionality to acquire footage of an area outside the vehicle as captured by the vehicle exterior camera 22. The acquisition section 200 also acquires speech spoken by an occupant from the microphone 23. The acquisition section 200 also acquires position information of the vehicle 12 from the GPS device 24.

The acquisition section 200 also includes functionality to acquire images posted by an occupant on SNS (hereafter sometimes referred to as "posted images") transmitted from the SNS server 40. In addition to the posted images, the acquisition section 200 may also acquire information such as text information or speech information posted by the occupant on SNS. Moreover, the acquisition section 200 acquires sites having captured images posted by a predetermined number (for example, 100,000) or more accounts on SNS as transmitted from the SNS server 40

The extraction section 210 includes functionality to extract plural extracted images from the footage acquired by the acquisition section 200. The extracted images are images including an image captured at a point in time satisfying a predetermined condition (hereafter referred to as a "trigger acquisition time"). In the present exemplary embodiment all images captured from a specific time before the trigger acquisition time (for example, 5 seconds before the trigger acquisition time) up to a specific time after (for example, 5 seconds after the trigger acquisition time) are employed as the extracted images.

Note that in the present exemplary embodiment a point in time when a state of the occupant changed is employed as the trigger acquisition time. More specifically, a point in time when speech spoken by an occupant changed by a predetermined threshold V (hereinafter simply referred to as "threshold V") or greater, or a point in time when the occupant moved off the sitting surface, is applied as the time when the state of the occupant changed. Note that a point in time when a gaze of the occupant changed by a predetermined threshold or greater, a point in time when an expression of the occupant changed, or the like may also be applied as the time when the state of the occupant changed.

Moreover, in the present exemplary embodiment a point in time when speech including a predetermined word was spoken by an occupant may also be applied as the trigger acquisition time. In the present exemplary embodiment at least one among words expressing interest in something outside the vehicle such as "What is that outside?", or words expressing a feeling toward a scene such as "Beautiful sea isn't it", is employed as the predetermined word. Moreover, in the present exemplary embodiment a point in time the occupant instructed image capture of outside the vehicle is employed as the trigger acquisition time.

Furthermore, a point in time when the vehicle 12 has passed a predetermined site is employed as the trigger acquisition time in the present exemplary embodiment. In the present exemplary embodiment a site having captured images posted by a predetermined number of accounts on SNS, or a site where there are a predetermined number of people P (hereinafter simply referred to as "people number P") present in the detectable range of the human detection sensor 26, as acquired by the acquisition section 200, is employed as the predetermined site. Note that a destination set by the occupant in a car navigation system installed at the vehicle 12 may also be employed as the predetermined site.

The generation section 220 generates a score calculation formula for each genre by machine learning with a neural network or the like using training data of a data set combining posted images with preference scores of the occupant acquired in advance by the acquisition section 200, and stores the generated score calculation formulae in the storage 20D. Note that the generation section 220 may also employ a data set combining posted images with a number of positive evaluations for the posted images as the training data.

The inference section 230 includes functionality to determine a desired image, which is a most desirable image for the occupant of the vehicle, from among plural extracted images extracted by the extraction section 210. Note that not only may the desired image be a still image, but also be a video image. In the present exemplary embodiment the inference section 230 determines the desired image based on results of machine learning performed on the posted images acquired by the acquisition section 200. More specifically, the inference section 230 determines the genre of each of the extracted images by inputting the extracted image to a convolutional neural network model (hereafter referred to as a CNN model). The inference section 230 also selects the score calculation formula that was associated with the determined genre from the storage 20D. The inference section 230 then inputs the extracted image to the selected score calculation formula and computes an evaluation score for each of the extracted images. The inference section 230 then determines the image having the highest evaluation score from among the extracted images to be the desired image.

Note that the inference section 230 may be configured so as to determine the desired image based on the results of machine learning performed on images posted for accounts linked to the occupant on SNS. In other words, the inference section 230 may determine the desired image based machine learning performed on images posted by at least one of accounts followed by the occupant on SNS (hereafter referred to as "followees") or accounts following the occupant on SNS (hereafter referred to as "followers"). More specifically, the acquisition section 200 acquires posted images from at least one of followees or followers, and acquires a number of positive evaluations for these posted images. The generation section 220 generates the score calculation formula for each of the genres by performing machine learning with a neural network or the like using these posted images and these numbers of positive evaluations acquired by the acquisition section 200 as training data. The inference section 230 then inputs each of the extracted images into the score calculation formula associated with the respective determined genre and determines the image having the highest evaluation score from among the extracted images to be the desired image.

Moreover, the inference section 230 may determine the desired image based on the results of machine learning performed on posted images from accounts having a number of follower accounts on SNS (hereafter referred to as "number of followers") that is predetermined number (for example 1 million) or greater. More specifically, the acquisition section 200 may acquire posted images from accounts having the predetermined number of followers or greater and acquire the numbers of positive evaluations for the posted images by these accounts. The generation section 220 then generates a score calculation formula for each of the genres using machine learning with a neural network or the like on training data of the posted images and the numbers of positive evaluations acquired by the acquisition section 200. The inference section 230 then inputs the extracted images into the score calculation formula associated with the determined genre and determines the image having the highest evaluation score from among the extracted images to be the desired image.

Note that when there is no training data, the inference section 230 may determine the desired image from among the plural extracted images extracted by the extraction section 210 using reinforcement learning. Moreover, the inference section 230 may determine the desired image without employing machine learning. For example, the inference section 230 may determine the desired image to be the image having the greatest similarity in the extracted images to the most recent posted image or to the posted image receiving the highest number of positive evaluations.

The output section 240 includes functionality to output the desired image determined by the inference section 230. In the present exemplary embodiment the output section 240 outputs the desired image to the smartphone 50. However, there is no limitation thereto. For example, the output section 240 may output the desired image to a display provided to the instrument panel of the vehicle 12.

Processing Flow

Explanation next follows regarding a flow of processing in the image extraction system 10 of the present exemplary embodiment.

Figure 4:
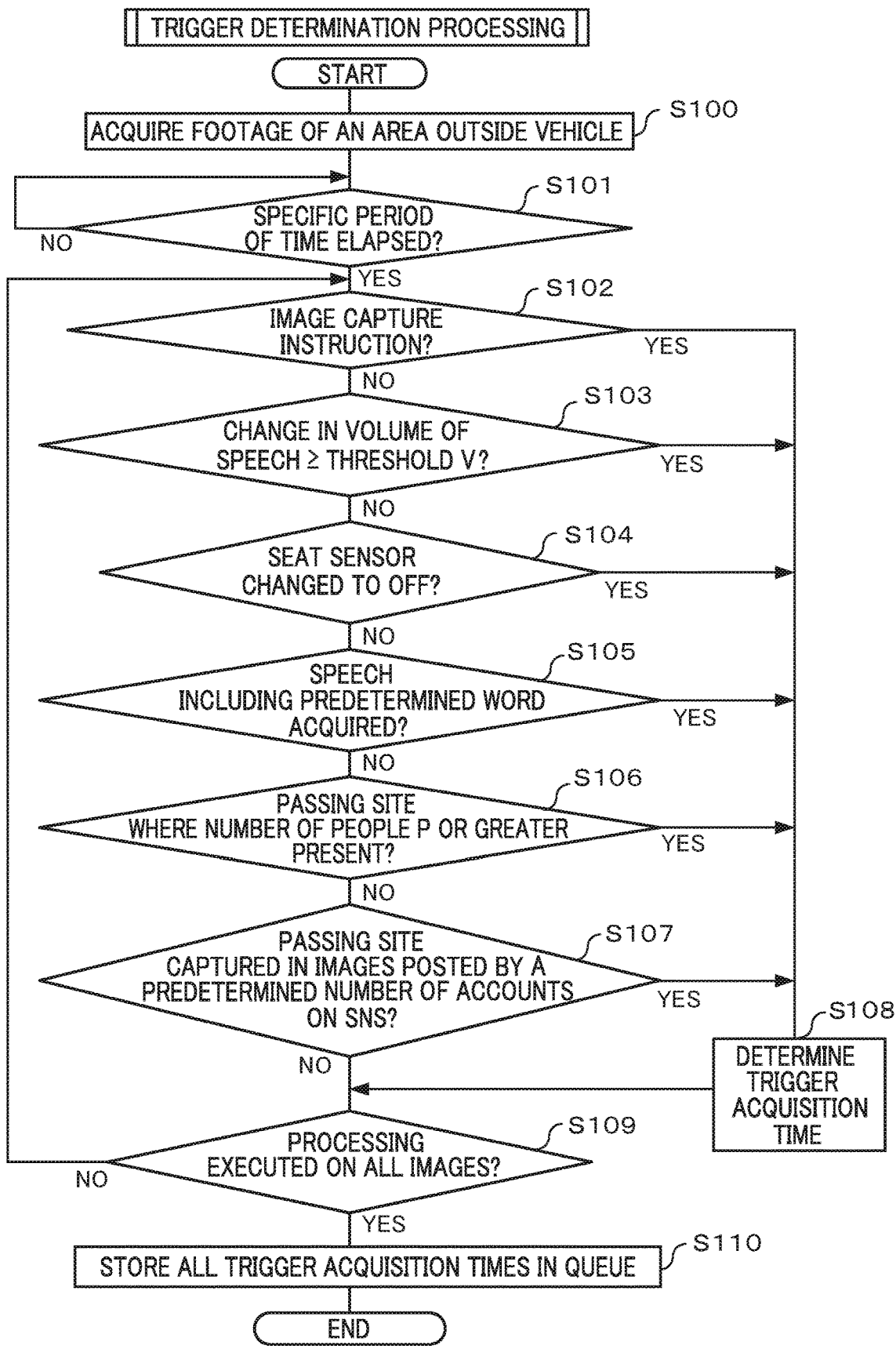
FIG. 4 is a flowchart to illustrate an example of a flow of trigger determination processing performed by a control device according to the present exemplary embodiment.

First explanation follows regarding trigger determination processing executed by the CPU 20A of the control device 20 reading and executing the control program 250, with reference to FIG. 4.

First, at step S100 the CPU 20A acquires footage of an area outside the vehicle as captured by the vehicle exterior camera 22. The CPU 20A then proceeds to step S101.

At step S101, the CPU 20A remains on standby until a specific period of time (for example, 5 minutes) has elapsed. In other words, the CPU 20A sleeps for the specific period of time. When the specific period of time has elapsed the CPU 20A proceeds to step S102.

At step S102, the CPU 20A determines whether or not the occupant has instructed image capture of outside the vehicle while the vehicle exterior camera 22 has been capturing the footage acquired at step S100. More specifically, the CPU 20A determines whether or not input has been received of an instruction to perform image capture of outside the vehicle through a switch or the like provided to the vehicle 12 while the vehicle exterior camera 22 has been imaging the footage acquired at step S100. The CPU 20A proceeds to step S108 when determined that the occupant has instructed image capture of outside the vehicle during image capture by the vehicle exterior camera 22 of the footage acquired at step S100 (step S102: YES). However, the CPU 20A proceeds to step S103 when determined that the occupant has not instructed image capture of outside the vehicle during image capture by the vehicle exterior camera 22 of the footage acquired at step S100 (step S102: NO).

At step S103, the CPU 20A determines whether or not a change in volume of the speech spoken by the occupant is the threshold V or greater during image capture by the vehicle exterior camera 22 of the footage acquired at step S100. More specifically, the CPU 20A determines whether or not speech acquired through the microphone 23 changed by the threshold V or greater during image capture by the vehicle exterior camera 22 of the footage acquired at step S100. The CPU 20A proceeds to step S108 in cases in which the change in volume of the speech spoken by the occupant was determined to be the threshold V or greater during image capture by the vehicle exterior camera 22 of the footage acquired at step S100 (step S103: YES). However, the CPU 20A proceeds to step S104 in cases in which the change in volume of the speech spoken by the occupant was determined not to be the threshold V or greater during image capture by the vehicle exterior camera 22 of the footage acquired at step S100 (step S103: NO).

At step S104, the CPU 20A determines whether or not the seat sensor 25 switched from ON to OFF during image capture by the vehicle exterior camera 22 of the footage acquired at step S100. More specifically, the CPU 20A determines whether or not the occupant moved away from the sitting surface during image capture by the vehicle exterior camera 22 of the footage acquired at step S100. The CPU 20A proceeds to step S108 in cases in which the seat sensor 25 is determined to have switched from ON to OFF during image capture by the vehicle exterior camera 22 of the footage acquired at step S100 (step S104: YES). However, the CPU 20A proceeds to step S105 in cases in which the seat sensor 25 is determined not to have switched from ON to OFF during image capture by the vehicle exterior camera 22 of the footage acquired at step S100 (step S104: NO).

At step S105, the CPU 20A determines whether or not speech including a predetermined word has been acquired during image capture by the vehicle exterior camera 22 of the footage acquired at step S100. More specifically, the CPU 20A determines whether or not at least one word from among words expressing interest in something outside the vehicle or words expressing a feeling toward a scene was contained in the speech acquired through the microphone 23 during image capture by the vehicle exterior camera 22 of the footage acquired at step S100. The CPU 20A proceeds to step S108 in cases in which speech containing a predetermined word was determined to have been acquired during image capture by the vehicle exterior camera 22 of the footage acquired at step S100 (step S105: YES). However, the CPU 20A proceeds to step S106 in cases in which speech containing a predetermined word was determined not to have been acquired during image capture by the vehicle exterior camera 22 of the footage acquired at step S100 (step S105: NO).

At step S106, the CPU 20A determines whether or not the vehicle 12 has passed a site where people present in a predetermined range from the vehicle 12 (namely, in a people detectable range of the human detection sensor 26) is a number of people P or greater during image capture by the vehicle exterior camera 22 of the footage acquired at step S100. In other words, the CPU 20A determines whether or not a change amount of a value of the human detection sensor 26 is a predetermined threshold S or greater during image capture by the vehicle exterior camera 22 of the footage acquired at step S100. The CPU 20A proceeds to step S108 in cases in which the vehicle 12 is determined to have passed a site where the people present in the predetermined range from the vehicle 12 is the number of people P or greater during image capture by the vehicle exterior camera 22 of the footage acquired at step S100 (step S106: YES). However, the CPU 20A proceeds to step S107 in cases in which the vehicle 12 is determined not to have passed a site where the people present in the predetermined range from the vehicle 12 is the number of people P or greater during image capture by the vehicle exterior camera 22 of the footage acquired at step S100 (step S106: NO).

At step S107, the CPU 20A determines whether or not the vehicle 12 has passed a site captured in images posted by a predetermined number of accounts on SNS during image capture by the vehicle exterior camera 22 of the footage acquired at step S100. More specifically, the CPU 20A determines whether or not the vehicle 12 has passed such a captured site from position information of the vehicle 12 acquired by the GPS device 24. The CPU 20A proceeds to step S108 in cases in which the vehicle 12 is determined to have passed a site captured in images posted by a predetermined number of accounts on SNS during image capture by the vehicle exterior camera 22 of the footage acquired at step S100 (step S107: YES). However, the CPU 20A proceeds to step S109 in cases in which the vehicle 12 is determined not to have passed a site captured in images posted by a predetermined number of accounts on SNS during image capture by the vehicle exterior camera 22 of the footage acquired at step S100 (step S107: NO).

At step S108 the CPU 20A acquires a trigger acquisition time. In other words, the CPU 20A acquires a point in time satisfying a condition corresponding to processing for which an affirmative determination was made in one of the processing from step S102 to step S107. For example at step S108 the CPU 20A acquires the time when the speech spoken by the occupant changed in volume by the threshold V or greater in cases in which the CPU 20A made an affirmative determination at step S103. The CPU 20A then proceeds to step S109.

At step S109 the CPU 20A determines whether or not the processing from step S102 to step S107 has been executed for all the images in the footage of an area outside the vehicle acquired at step S100. The CPU 20A proceeds to step S110 in cases in which determination is that the processing from step S102 to step S107 has been executed for all the images in the footage of an area outside the vehicle acquired at step S100 (step S109:YES). However, the CPU 20A returns to step S102 in cases in which determination is that the processing from step S102 to step S107 has not been executed for all the images in the footage of an area outside the vehicle acquired at step S100 (step S109: NO).

At step S110 the CPU 20A stores all of the acquired trigger acquisition times in a queue Q and ends the trigger determination processing.

Thus in the trigger determination processing the CPU 20A determines the trigger acquisition times.

Figure 5:
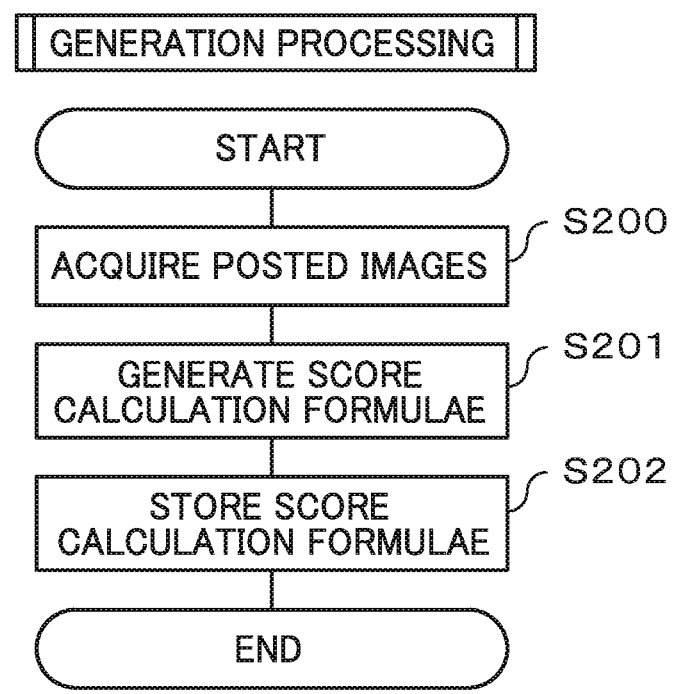
FIG. 5 is a flowchart to illustrate an example of a flow of generation processing performed by a control device according to a first exemplary embodiment.

Next, description follows regarding generation processing executed by the CPU 20A of the control device 20 reading the control program 250, with reference to FIG. 5.

First, at step S200 the CPU 20A acquires posted images from the SNS server 40. The CPU 20A then proceeds to step S201.

At step S201 the CPU 20A generates a score calculation formula for each of the genres using machine learning with a neural network or the like using training data of a data set combining the posted images and preference scores of the occupant acquired at step S200. The CPU 20A then proceeds to step S202.

At step S202 the CPU 20A stores the score calculation formulae generated at step S201 by genre in the storage 20D and ends the present generation processing.

Thus in the generation processing of the present exemplary embodiment the CPU 20A generates the score calculation formula by genre.

Figure 6:
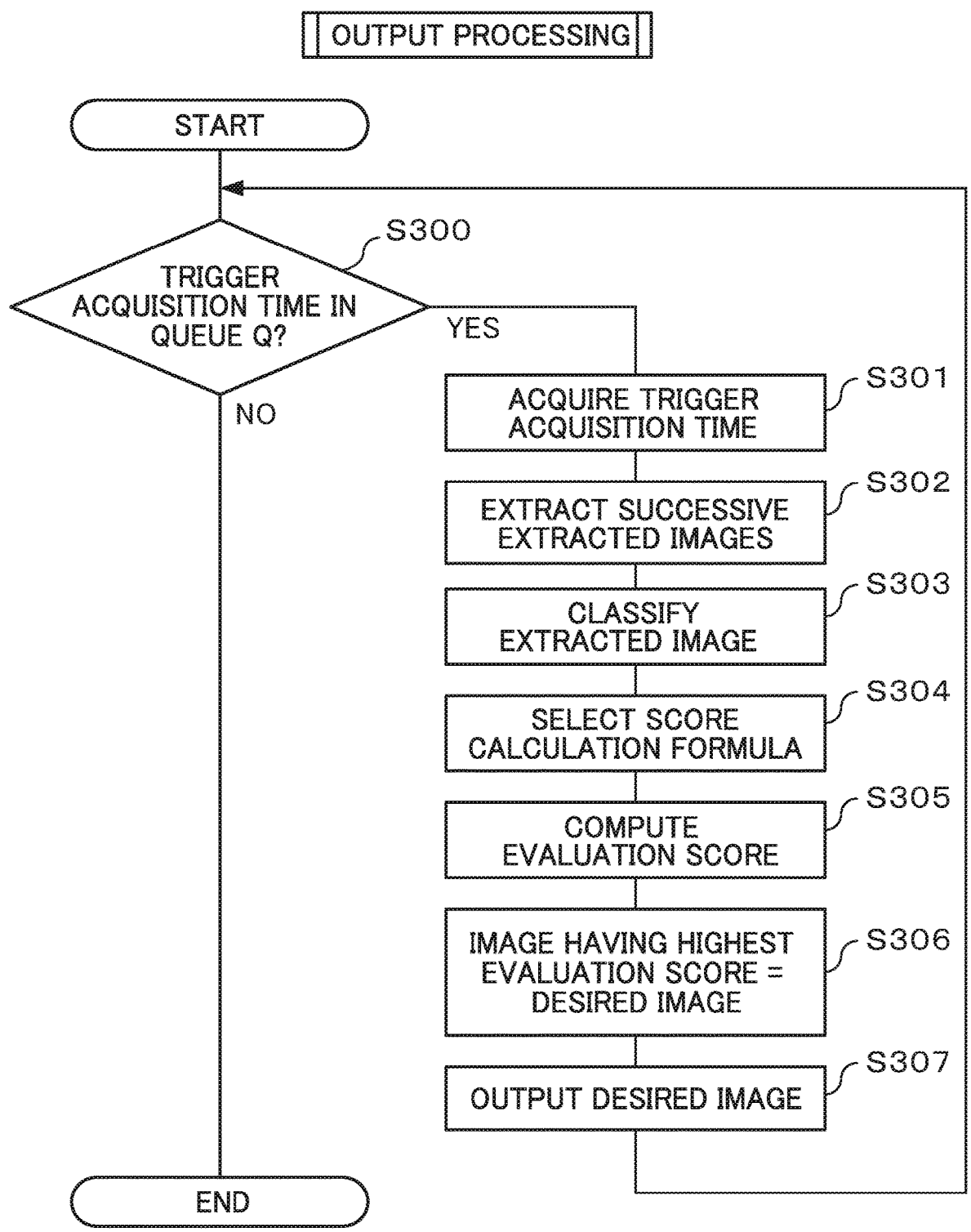
FIG. 6 is a flowchart to illustrate an example of a flow of output processing performed by a control device according to the present exemplary embodiment.

Next, description follows regarding output processing executed by the CPU 20A of the control device 20 reading the control program 250, with reference to FIG. 6.

First, at step S300 the CPU 20A determines whether or not there are is a trigger acquisition time stored in the queue Q. The CPU 20A proceeds to step S301 in cases in which a trigger acquisition time is determined to be stored in the queue Q (step S300: YES). However, the CPU 20A ends the present output processing in cases in which determination is that there is no trigger acquisition time stored in the queue Q (step S300: NO).

At step S301 the CPU 20A acquires the trigger acquisition time from the queue Q. The CPU 20A then proceeds to step S302.

At step S302 the CPU 20A extracts successive extracted images. More specifically, the CPU 20A extracts all images captured from a specific time before the trigger acquisition time acquired at step S301 to a specific time after. The CPU 20A then proceeds to step S303.

At step S303 the CPU 20A classifies the extracted images. More specifically, the CPU 20A inputs the extracted images into a CNN model and determines the genre of the extracted images. The CPU 20A then proceeds to step S304.

At step S304 the CPU 20A selects from the storage 20D the score calculation formula associated with the genre determined at step S303. The CPU 20A then proceeds to step S305.

At step S305 the CPU 20A inputs the extracted image to the score calculation formula selected at step S304 and computes an evaluation score for each of the extracted images. The CPU 20A then proceeds to step S306.

At step S306 the CPU 20A determines the image having the highest evaluation score from among the extracted images to be the desired image. The CPU 20A then proceeds to step S307.

At step S307 the CPU 20A outputs the desired image determined at step S306 to the smartphone 50. The CPU 20A then returns to step S300.

Thus in the output processing the image having the highest evaluation score from among the extracted images is output as the desired image.

Summary of First Exemplary Embodiment

In the image extraction system 10 of the present exemplary embodiment there is a higher likelihood of being able to output the most desirable image for an occupant than cases in which image capture is performed once alone.

The control device 20 of the present exemplary embodiment includes functionality to extract images including an image captured at a point in time when a volume of the speech spoken by the occupant changed by a threshold V or greater, or captured at a point in time when the occupant moved away from the sitting surface. This enables extracted images to be extracted even in cases in which the occupant was not able to perform a physical image capture instruction such as by pressing a switch or the like.

Moreover, the control device 20 of the present exemplary embodiment includes functionality to extract images including an image captured at a point in time when the occupant spoke at least one word among words expressing interest in something outside the vehicle or words expressing a feeling toward a scene. This enables extraction of extracted images even in cases in which the occupant was not able to perform a physical image capture instruction such as by pressing a switch or the like.

Moreover, the control device 20 of the present exemplary embodiment includes functionality to extract an image captured at a point in time when the vehicle 12 passed a site captured in images posted by a predetermined number of accounts or greater on SNS, or a site where people present in a people detectable range of the human detection sensor 26 was a number of people P or greater. This enables the extraction of extracted images even in cases in which the occupant was not able to perform a physical image capture instruction such as by pressing a switch or the like.

Moreover, the control device 20 of the present exemplary embodiment has a function of determining a desired image based on the results of machine learning performed on images posted by the occupant on SNS. This enables the desired image from among plural extracted images to be determined based on images posted by the occupant on SNS.

Second Exemplary Embodiment

In the first exemplary embodiment the CPU 20A determined the desired image based on the results of machine learning performed on images posted by the occupant on SNS. In the second exemplary embodiment the desired image is determined based on the results of machine learning performed on a behavior history of the occupant. In the first exemplary embodiment the desired image is determined and the desired image is output by the CPU 20A. In the second exemplary embodiment the desired image is determined and the desired image is output by a separate device to the control device 20. Next, explanation follows regarding points of difference to the first exemplary embodiment.

Configuration

Figure 7:
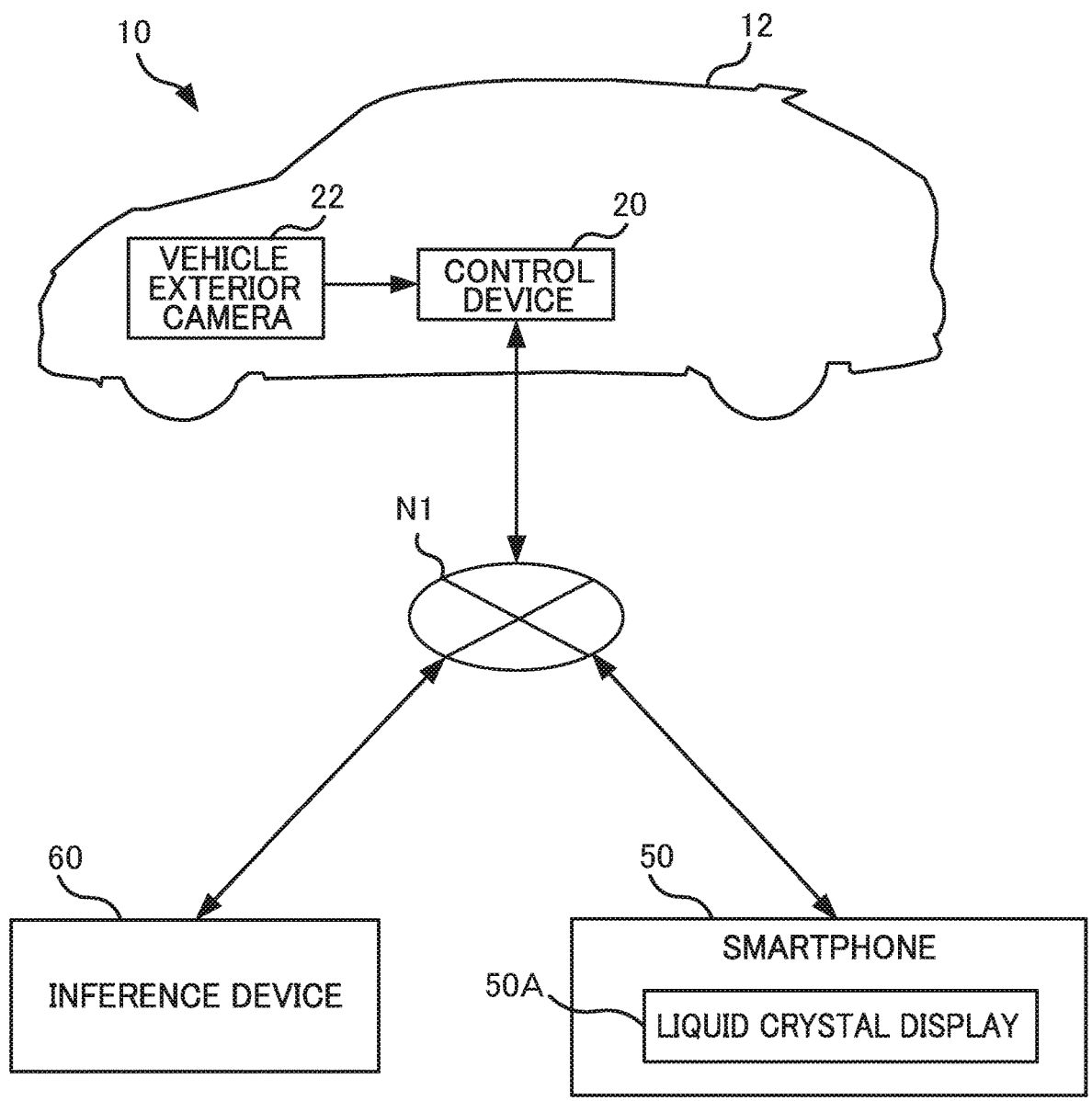
FIG. 7 is a diagram illustrating a schematic configuration of an image extraction system according to a second exemplary embodiment.

FIG. 7 is a block diagram illustrating a schematic configuration of the image extraction system 10 according to the present exemplary embodiment.

The block diagram illustrating a schematic configuration of the image extraction system 10 illustrated in FIG. 7 differs from the block diagram illustrating a schematic configuration of the image extraction system 10 illustrated in FIG. 1 in the point that the image extraction system 10 includes an inference device 60 provided instead of the SNS server 40.

The inference device 60 includes a function as a server to determine the desired image and output the desired image.

Processing Flow

Next, description follows regarding a flow of processing in the image extraction system 10 of the present exemplary embodiment. Note that the trigger determination processing is the same as that of the first exemplary embodiment and so explanation thereof will be omitted.

Figure 8:
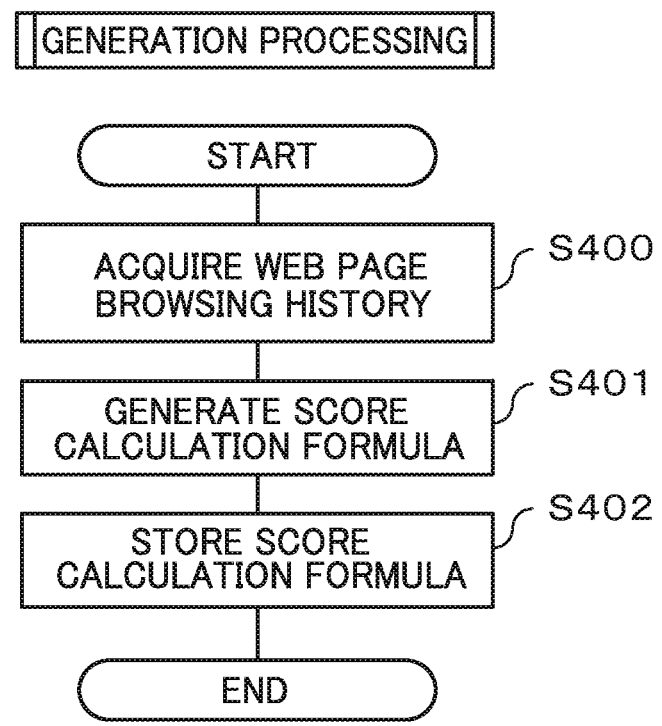
FIG. 8 is a flowchart to illustrate an example of a flow of generation processing performed by a control device according to the second exemplary embodiment.

First explanation follows regarding a flow of generation processing executed by the CPU 20A of the control device 20 reading the control program 250, with reference to FIG. 8.

First, at step S400 the CPU 20A acquires, from the smartphone 50, a browsing history of web pages the occupant has viewed using a world wide web (web) browser. In the present exemplary embodiment information of uniform resource locators (URL), titles, browsing start times, and the like are employed as the browsing history. The CPU 20A then proceeds to step S401.

At step S401 the CPU 20A generates score calculation formulae by genre using machine learning with a neural network or the like using training data of a data set combining the web page browsing history and preference scores of the occupant acquired at step S400. The CPU 20A then proceeds to step S402.

At step S402 the CPU 20A stores the score calculation formulae generated at step S401 by genre in the storage 20D and then ends the present generation processing.

In the generation processing of the present exemplary embodiment the CPU 20A generates score calculation formulae by genre using the training data that combines the web page browsing history of the occupant with the preference scores of the occupant.

In the present exemplary embodiment the web page browsing history of the occupant is employed as the behavior history of the occupant. However, there is no limitation thereto. For example, the travel history or the like of the vehicle 12 may be employed as the behavior history of the occupant.

Next, description follows regarding extraction processing executed by the CPU 20A of the control device 20 reading and executing the control program 250, with reference to FIG. 9.

The processing from step S500 to step S502 in the extraction processing is the same as the processing from step S300 to step S302 of the output processing of the first exemplary embodiment, and so explanation thereof will be omitted.

At step S503 of FIG. 9, the extracted images extracted at step S502 are transmitted to the inference device 60. The CPU 20A then returns to step S500.

Next, description follows regarding inference processing executed by a CPU 60A provided to the inference device 60 reading a program, with reference to FIG. 10.

At step S600 the CPU 60A receives the extracted images from the control device 20. The CPU 60A then proceeds to step S601.

At step S601 the CPU 60A classifies each of the extracted images received from the control device 20. More specifically, the CPU 60A determines the genre of the extracted image by inputting the extracted image into a CNN model. The CPU 60A then proceeds to step S602.

At step S602 the CPU 60A receives the score calculation formula associated with the genre determined at step S601 from the control device 20. The CPU 60A then proceeds to step S603.

At step S603 the CPU 60A inputs the extracted image into the score calculation formula received at step S602 and computes an evaluation score for each of the extracted images. The CPU 60A then proceeds to step S604.

At step S604 the CPU 60A determines the image having the highest evaluation score from among the extracted images to be the desired image. The CPU 60A then proceeds to step S605.

At step S605 the CPU 60A outputs the desired image determined at step S604 to the smartphone 50 then ends the inference processing.

Thus in the inference processing of the present exemplary embodiment the image having the highest evaluation score from among the extracted images is output as the desired image.

Note that in the present exemplary embodiment the inference device 60 and the smartphone 50 are different devices. However, there is no limitation thereto. For example, the inference device 60 and the smartphone 50 may be the same device. In other words, the smartphone 50 may both determine the desired image and display the desired image on the liquid crystal display 50A.

Moreover, in the present exemplary embodiment, the CPU 60A provided to the inference device 60 inputs the extracted images to the score calculation formulae generated by the CPU 20A provided in the control device 20 and computes their evaluation scores. However, there is no limitation thereto. The CPU 60A provided to the inference device 60 may input the extracted images to score calculation formula generated by the CPU 60A and compute their evaluation scores. In such cases, the computation formula data 260 is not stored in the storage 20D provided to the control device 20 and instead the computation formula data 260 is stored in storage provided to the inference device 60.

Remarks

In the image extraction system 10 of the exemplary embodiment described above the control device 20 is employed in a mode inbuilt into the vehicle 12. However, the control device 20 may be installed to an external portion of the vehicle 12. The control device 20 in such cases acquires the footage an area of outside the vehicle from the vehicle exterior camera 22 over the network N1.

Note that the trigger determination processing, generation processing, output processing, and extraction processing executed by the CPU 20A reading software (programs) in the exemplary embodiments described above may be executed by various processors other than a CPU. Examples of such processors include programmable logic devices (PLD) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). The trigger determination processing, generation processing, output processing, and extraction processing may be executed by any one of these various types of processors, or may be executed by a combination of two or more of the same type or different types of processors (such as plural FPGAs, or a combination of a CPU and an FPGA). The hardware structure of these various types of processors is more specifically an electric circuit combining circuit elements such as semiconductor elements.

Moreover, although in the exemplary embodiments described above a mode was described in which the control program 250 was pre-stored (installed) in the storage 20D, there is no limitation thereto. The program may be provided in a format recorded on a recording medium such as a compact disc read only memory (CD-ROM), digital versatile disc read only memory (DVD-ROM), universal serial bus (USB) memory, or the like. The program may also be provided in a format downloadable from an external device over a network.

With regard to the flow of processing as described in the above exemplary embodiments, for example, redundant steps may be omitted, new steps may be added, and the processing sequence may be swapped around within a range not departing from the spirit of the present disclosure.

The respective configurations of the vehicle 12, the control device 20, the SNS server 40, the smartphone 50, and the inference device 60 as described in the above exemplary embodiments are moreover merely examples thereof, and these configurations may be modified according to circumstances within a range not departing from the spirit of the present disclosure.

What is claimed is:

1. An image extraction device comprising:
   a processor, the processor being configured to:
   acquire footage of an area outside a vehicle, the footage captured by an image capture device installed at the vehicle;
   extract, from the footage, a plurality of extracted images that are images including an image captured at a point in time satisfying a predetermined condition;
   determine a genre of each of the plurality of extracted images;
   select a score calculation formula associated with the genre of each of the plurality of extracted images;

compute an evaluation score for each of the plurality of extracted images by inputting the extracted image to the score calculation formula;

determine an image having a highest evaluation score to be a desired image that is an image most desirable to an occupant of the vehicle, from among the plurality of extracted images; and output the desired image.

2. The image extraction device of claim 1, wherein, as the extracted images, the processor extracts images including an image captured at a point in time when a state of the occupant changed.

3. The image extraction device of claim 1, wherein, as the extracted images, the processor extracts images including an image captured at a point in time when the occupant spoke a predetermined word.

4. The image extraction device of claim 1, wherein, as the extracted images, the processor extracts images including an image captured at a point in time when the vehicle passed a predetermined site.

5. The image extraction device of claim 1, wherein the processor determines the desired image based on a result of machine learning performed on images posted via a social networking service.

6. The image extraction device of claim 5, wherein the processor determines the desired image based on a result of machine learning performed on images posted by the occupant via a social networking service.

7. The image extraction device of claim 1, wherein, as the desired image, the processor determines an image having greatest similarity to an image receiving a highest number of positive evaluations from among images posted by the occupant via a social networking service.

8. The image extraction device of claim 1, wherein the processor determines the desired image based on a result of machine learning performed on a behavior history of the occupant.

9. The image extraction device of claim 8, wherein the processor determines the desired image based on a result of machine learning performed on a browsing history of web pages by the occupant.

10. The image extraction device of claim 8, wherein the processor determines the desired image based a result of machine learning performed on a travel history of the vehicle.

11. A vehicle comprising:
the image extraction device of claim 1; and
the image capture device.

12. An image extraction system comprising:
the image extraction device of claim 1; and
a mobile terminal, wherein the mobile terminal includes a display device to display the desired image.

13. An image extraction method of processing for execution by a computer, the processing comprising:
acquiring footage of an area outside a vehicle, the footage captured by an image capture device installed at the vehicle;

extracting, from the footage, a plurality of extracted images that are images including an image captured at a point in time satisfying a predetermined condition;

determining a genre of each of the plurality of extracted images;

selecting a score calculation formula associated with the genre of each of the plurality of extracted images;

computing an evaluation score for each of the plurality of extracted images by inputting the extracted image to the score calculation formula;

determining an image having a highest evaluation score to be a desired image that is an image most desirable to an occupant of the vehicle, from among the plurality of extracted images; and outputting the desired image.

14. A non-transitory storage medium storing an image extraction program that causes a computer to execute processing comprising:
acquiring footage of an area outside a vehicle, the footage captured by an image capture device installed at the vehicle;

extracting, from the footage, a plurality of extracted images that are images including an image captured at a point in time satisfying a predetermined condition;

determining a genre of each of the plurality of extracted images;

selecting a score calculation formula associated with the genre of each of the plurality of extracted images;

computing an evaluation score for each of the plurality of extracted images by inputting the extracted image to the score calculation formula;

determining an image having a highest evaluation score to be a desired image that is an image most desirable to an occupant of the vehicle, from among the plurality of extracted images; and outputting the desired image.

* * * * *